United States Patent Office 3,256,287
Patented June 14, 1966

3,256,287
PROCESS FOR Δ⁷-6-OXOMORPHINAN DERIVATIVES
Yoshiro Sawa and Shin Maeda, Hyogo Prefecture, Japan, assignors to Shionogi & Co., Ltd., Osaka, Japan
No Drawing. Filed Apr. 4, 1963, Ser. No. 270,557
Claims priority, application Japan, Apr. 11, 1962, 37/14,650
3 Claims. (Cl. 260—285)

The present invention relates to Δ⁷-6-oxomorphinan derivatives and production thereof.

In the term "morphinan" herein employed, there are included all the compounds having a fundamental structure representable by the following planar formula:

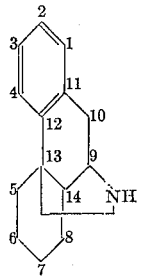

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro - 2H - 10,4a-iminoethanophenanthrene), inclusively. When distinction is necessary, normal morphinan and isomorphinan will be hereinafter designated as "morphinan (cis)" and "morphinan (trans)", respectively. The position-numbering hereinafter employed for the morphinan derivatives is that generally accepted in morphinan chemistry as shown in the above planar formula.

The objective Δ⁷-6-oxomorphinan derivative in the present invention is representable by the following planar formula:

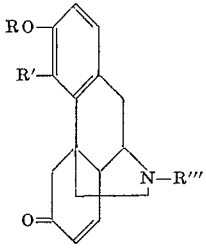

(I)

wherein R represents a hydrogen atom, an acyl group such as lower alkanoyl (e.g. acetyl, propionyl, butyryl) or a lower alkyl group (e.g. methyl, propyl, butyl), R' represents a hydrogen atom, an aryloxy group (e.g. phenyloxy, naphthyloxy) or a substituted aryloxy group (e.g. substituted phenyloxy, substituted napthyloxy) wherein the substituent is lower alkyl (e.g. methyl, ethyl, propyl), lower alkoxy (e.g. methoxy, ethoxy, propoxy), nitro or amino and R''' represents a hydrogen atom, a lower alkyl group (e.g. methyl, ethyl, propyl) or an ar(lower)-alkyl group, e.g. benzyl, phenethyl) and shows various pharmacological activities such as analgesic activity and antitussive activity.

Accordingly, a basic object of the present invention is to embody the Δ⁷-6-oxomorphinan derivative of Formula I. Another object of the invention is to embody the pharmacologically active Δ⁷-6-oxomorphinan (I). A further object of the invention is to embody a process for preparing the Δ⁷-6-oxomorphinan (I). These and other objects will be apparent to those conversant with the art to which the present invention pertains from the subsequent description.

The process of the present invention is illustratively represented by the following scheme:

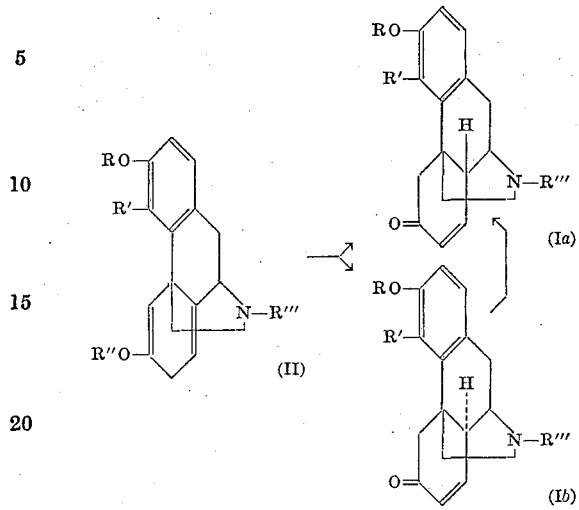

wherein R, R' and R''' each has the same significance as designated above and R'' represents a lower alkyl group (e.g. methyl, ethyl, propyl).

As the starting material, there may be used the optically active or racemic Δ⁵,⁸-6-alkoxymorphinan of Formula II.

According to the process of the present invention, the starting Δ⁵,⁸-6-alkoxymorphinan (II) is subjected to hydrolysis with the simultaneous transformation of the double bond to produce a mixture of the Δ⁷-6-oxomorphinan (cis) (Ia) and the Δ⁷-6-oxomorphinan (trans) (Ib), if necessary, followed by isomerization of the latter (Ib) to the former (Ia). The hydrolytic transformation is accomplished by treating the Δ⁵,⁸-6-alkoxymorphinan (II) with an acidic substance such as organic acid (e.g. acetic acid, oxalic acid), inorganic acid (e.g. hydrochloric acid, sulfuric acid, nitric aid) and acidic salts thereof (e.g. potassium bisulfate, sodium bisulfate) in a hydrous medium at room temperature (10 to 30° C.) or while heating. Although there is usually obtained a mixture of the Δ⁷-6-oxomorphinan (cis) (Ia) and the Δ⁷-6-oxomorphinan (trans) (Ib) as the product, either of the said two isomers can be predominantly prepared by regulating the concentration of the employed acidic substance. Generally speaking, the high concentration of the acidic substance results in the prevalent production of the Δ⁷-6-oxomorphinan (cis) (Ia), while the low concentration causes the predominant production of the Δ⁷-6-oxomorphinan (trans) (Ib). The isomerization of the Δ⁷-6-oxomorphinan (trans) (Ib) to the Δ⁷-6-oxomorphinan (cis) (Ia) is executed by treating the former with a high concentration of the said acidic substance in a hydrous medium at room temperature (10 to 30° C.) or while heating. In the above hydrolytic transformation and/or isomerization, if any, the hydrolyzable group such as 3-acyloxy may be simultaneously decomposed. However, the intended hydrolytic transformation and/or isomerization are not blocked by this side reaction.

The objective Δ⁷-6-oxomorphinan (I) occurs in optically active form as well as in racemic mixture and these are all within the scope of the present invention.

The Δ⁷-6-oxomorphinan (I) forms acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The thus-produced Δ⁷-6-oxomorphinan (I) and acid addition salts thereof exhibit various pharmacological activities such as analgesic activity and antitussive activity. For instance, the analgesic activity, antitussive activity and toxicity of some Δ⁷-6-oxomorphinan derivatives according to the present invention are shown in the following table:

TABLE

| Compound | Analgesic activity | Antitussive activity | Toxicity (LD$_{50}$, mg./kg.) |
|---|---|---|---|
| (−)-3-Hydroxy-6-oxo-N-methyl-Δ⁷-morphinan (cis) | 3.7 | 4.1 | 345.0 |
| (−)-3-Methoxy-6-oxo-N-methyl-Δ⁷-morphinan (cis) | 2.1 | 4.9 | 23.4 |
| (−)-3-Methoxy-6-oxo-N-methyl-Δ⁷-morphinan (trans) | 0.3 | 2.0 | 35.9 |

NOTE.—The analgesic activity was observed by the D'Amour-Smith method [D'Amour et al.: J. Pharmacol., vol. 1, p. 255 (1946)] in rats and is shown as the effective ratio to morphine, the value of which is expressed as 1. The anti-tussive activity was observed by the Winter method [Winter et al.: J. Exper. Med., vol. 101, p. 17 (1955)] in guinea pigs and is shown as the effective ratio to codeine, the value of which is expressed as 1. The toxicity was tested by the intravenous administration of the tested compound to mice and is shown by LD$_{50}$ (Lethal Dose).

The other Δ⁷-6-oxomorphinan derivatives of the present invention also show the similar pharmacological activities. Accordingly, they are useful as analgesic and/or antitussive agents.

Practical and presently preferred embodiments of the present invention are illustrated by the following examples. In the examples, abbreviations each have conventional meanings, e.g. mg.=milligram(s), g.=gram(s), ml.=millilitre(s), °C.=degrees centigrade.

EXAMPLE 1

Preparation of (−)-3-methoxy-6-oxo-N-methyl-Δ⁷-morphinan (cis) and (+)-3-methoxy-6-oxo-N-methyl-Δ⁷-morphinan (trans)

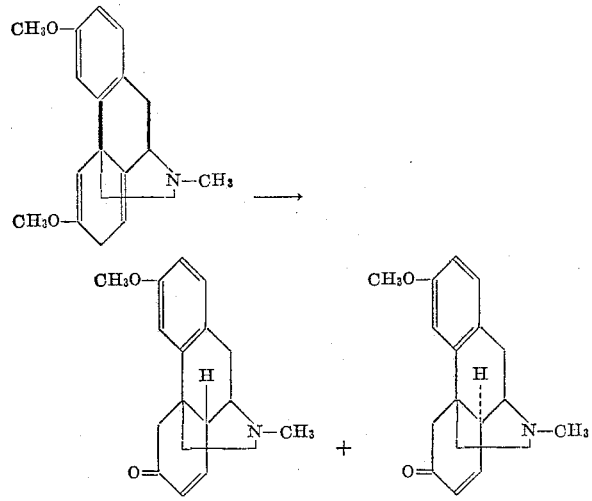

A solution of (−)-3,6-dimethoxy-N-methyl-Δ⁵,⁸-morphinan (cis) (2 g.) in 10% potassium bisulfate (40 ml.) is allowed to stand overnight at 18° C. The reaction mixture is made to alkalinity with sodium carbonate and shaken with benzene. The benzene layer is dried and chromatographed on alumina. The first fraction is evaporated and crystallized from ether to give (+)-3-methoxy-6-oxo-N-methyl-Δ⁷-morphinan (trans) (234 mg.) as crystals melting at 123° C. [α]$_D^{30}$ +51.7° (ethanol).

Analysis.—Calcd. for C$_{18}$H$_{21}$O$_2$N: C, 76.26; H, 7.47; N, 4.94. Found: C, 76.68; H, 7.69; N, 4.94.

The second fraction is evaporated and crystallized from ether to give (−)-3-methoxy-6-oxo-N-methyl-Δ⁷-morphinan (cis) (268 mg.) as crystals melting at 153 to 154° C. [α]$_D^{27}$ −81.9° (ethanol).

Analysis.—Calcd. for C$_{18}$H$_{21}$O$_2$N: C, 76.26; H, 7.47; N, 4.94. Found: C, 76.40; H, 7.71; N, 4.68.

The starting material of this example, (−)-3,6-dimethoxy-N-methyl-Δ⁵,⁸-morphinan (cis), is a known compound [Sawa et al.: Tetrahedron, vol. 15, p. 154 (1961)].

EXAMPLE 2

Preparation of (−)-3-methoxy-6-oxo-N-methyl-Δ⁷-morphinan (cis) and (+)-3-methoxy-6-oxo-N-methyl-Δ⁷-morphinan (trans)

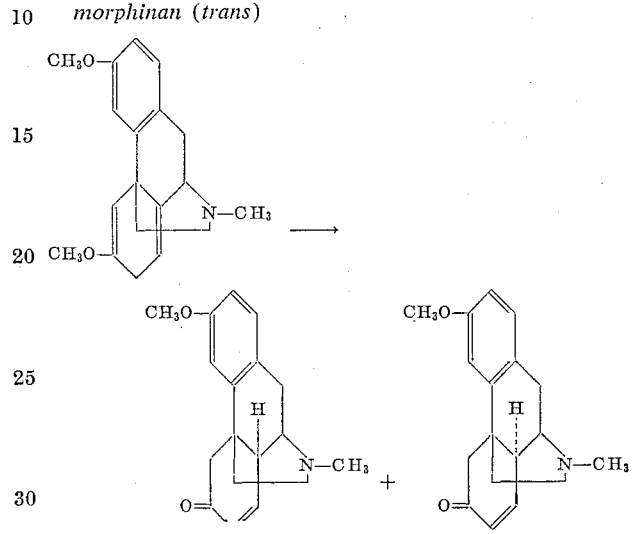

A solution of (−)-3,6-dimethoxy-N-methyl-Δ⁵,⁸-morphinan (cis) (2 g.) in 5% hydrochloric acid (10 ml.) is heated on a steam bath for 10 minutes. The reaction mixture is treated as in Example 1 whereby there are obtained (+)-3-methoxy-6-oxo-N-methyl-Δ⁷-morphinan (trans) (429 mg.) as crystals melting at 123° C. and (−)-3-methoxy-6-oxo-N-methyl-Δ⁷-morphinan (cis) (268 mg.) as crystals melting at 153° C.

EXAMPLE 3

Preparation of (−)-3-methoxy-6-oxo-N-methyl-Δ⁷-morphinan (cis)

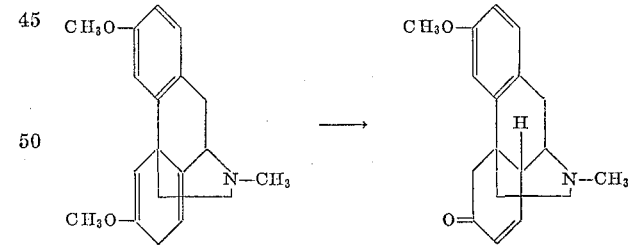

A solution of (−)-3,6-dimethoxy-N-methyl-Δ⁵,⁸-morphinan (cis) (1 g.) in 50% acetic acid (10 ml.) is heated on a steam bath for 1 hour. The reaction mixture is treated as in Example 1 whereby there is obtained (−)-3-methoxy-6-oxo-N-methyl-Δ⁷-morphinan (cis) (509 mg.) as crytals melting at 153 to 154° C.

EXAMPLE 4

Preparation of (−)-3-methoxy-6-oxo-N-methyl-Δ⁷-morphinan (cis)

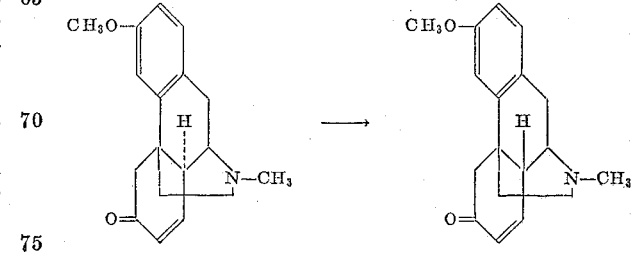

A mixture of (+)-3-methoxy-6-oxo-N-methyl-Δ⁷-morphinan (trans) (300 mg.) with 20% hydrochloric acid (3 ml.) is heated on a steam bath for 1 hour. The reaction mixture is treated as in Example 1 whereby there is obtained (−)-3-methoxy-6-oxo-N-methyl - Δ⁷ - morphinan (cis) (112 mg.) as crystals melting at 153 to 154° C.

EXAMPLE 5

Preparation of (−)-3-methoxy-6-oxo-N-methyl-Δ⁷-morphinan (cis)

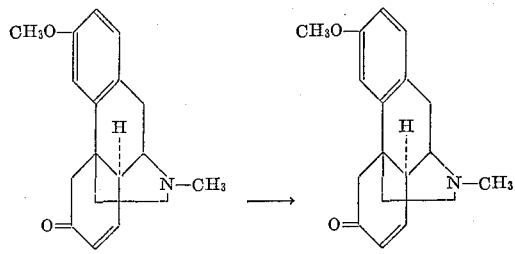

A mixture of (+)-3-methoxy-6-oxo-N-methyl-Δ⁷-morphinan (trans) (300 mg.) with 50% acetic acid (3 ml.) is heated on a steam bath for 1 hour. The reaction mixture is treated as in Example 1 whereby there is obtained (−)-3-methoxy-6-oxo-N-methyl - Δ⁷ - morphinan (cis) (132 mg.) as crystals melting at 152 to 153° C.

EXAMPLE 6

Preparation of (−)-3-methoxy-4-phenyloxy-6-oxo-N-methyl-Δ⁷-morphinan (cis) and (+)-3-methoxy-4-phenyloxy-6-oxo-N-methyl-Δ⁷-morphinan (trans)

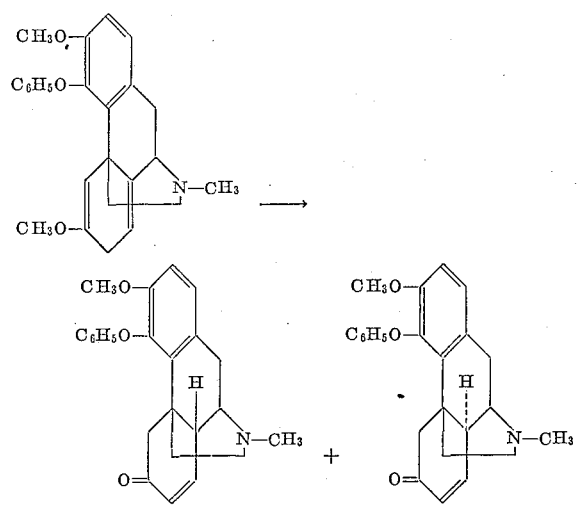

A solution of (+)-3,6-dimethoxy - 4 - phenyloxy-N-methyl-Δ⁵,⁸-morphinan (cis) (3.89 g.) in 10% hydrochloric acid (78 ml.) is heated on a steam bath for 15 minutes. After cooling, the reaction mixture is made to alkalinity with ammonia-water and shaken with benzene. The benzene layer is washed with water, dried and chromatographed on alumina (20 g.). The eluate (2.96 g.) with benzene is evaporated, treated with ether and filtered. The collected insoluble substance is crystallized from ethanol to give (+)-3-methoxy-4-phenyloxy-6-oxo-N-methyl-Δ⁷-morphinan (trans) (2.05 g.) as crystals melting at 157° C. [α]_D²⁹ +90.7° (chloroform).

Analysis.—Calcd. for $C_{24}H_{25}O_3N$: C, 76.77; H, 6.71; N, 3.73. Found: C, 76.93; H, 6.87; N, 3.55.

The methiodide.—M.P., 165 to 166° C. (crystallized from acetone).

The filtrate from which the insoluble substance was separated as above is evaporated. The residue is crystallized from ether saturated with water to give (−)-3-methoxy-4-phenyloxy-6-oxo-N-methyl-Δ⁷-morphinan (cis) (96.5 mg.) as crystals melting at 143° C. [α]_D²⁵ −12.4° (chloroform).

Analysis.—Calcd. for $C_{24}H_{25}O_3N \cdot \frac{1}{4}H_2O$: C, 75.86; H, 6.76; N, 3.69. Found: C, 75.93; H, 6.77; N, 3.30.

The Methiodide.—M.P., 185° C. (decomp.) (crystallized from acetone).

The starting material of this example, (+)-3,6-dimethoxy-4-phenyloxy-N-methyl-Δ⁵,⁸-morphinan (cis), is a known compound [Sawa et al.: Tetrahedron, Vol. 15, p. 154 (1961)].

EXAMPLE 7

Preparation of (−)-3-methoxy-4-phenyloxy-6-oxo-N-methyl-Δ⁷-morphinan (cis)

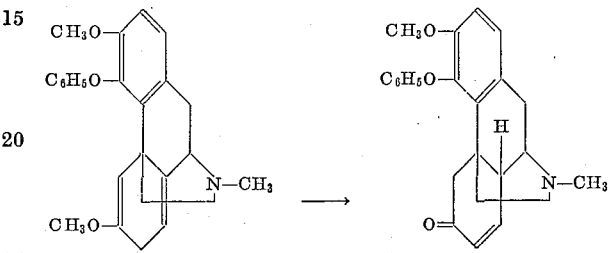

A solution of (+)-3,6-dimethoxy - 4 - phenyloxy-N-methyl-Δ⁵,⁸-morphinan (cis) (3.89 g.) in conc. hydrochloric acid (40 ml.) is heated on a steam bath for 15 minutes. After cooling, the reaction mixture is made to alkalinity with ammonia and shaken with benzene. The benzene layer is washed with water, dried and chromatographed on alumina (20 g.). The benzene solution is evaporated and crystallized from ether saturated with water to give (−)-3-methoxy - 4 - phenyloxy-6-oxo-N-methyl-Δ⁷-morphinan (cis) (1.81 g.) as crystals melting at 143° C.

What is claimed is:

1. A process for preparing Δ⁷-6-oxomorphinan derivatives which comprises treating (−)-3,6-dimethoxy-N-methyl-Δ⁵,⁸-morphinan (cis) with potassium bisulfate in an aqueous medium at a temperature from room temperature to reflux temperature, the concentration of the potassium bisulfate being about 10%, to produce a mixture of (−)-3-methoxy - 6 - oxo-N-methyl-Δ⁷-morphinan (cis) and (+)-3-methoxy-6-oxo-N-methyl-Δ⁷-morphinan (trans).

2. A process for preparing Δ⁷-6-oxomorphinan derivatives which comprises treating (−)-3,6-dimethoxy-N-methyl-Δ⁵,⁸-morphinan (cis) with acetic acid in an aqueous medium at a temperature from room temperature to reflux temperature the concentration of the acetic acid being about 50%, to produce (−)-3-methoxy-6-oxo-N-methyl-Δ⁷-morphinan (cis).

3. The process according to claim 2, wherein the treatment is carried out using about 50% acetic acid while heating on a steam bath.

References Cited by the Examiner

UNITED STATES PATENTS 3,085,091   4/1963   Sawa et al. _____ 260—285

OTHER REFERENCES

Bentley, The Chemistry of the Morphine Alkaloids, p. 302 (1954).

Gates et al., J. Am. Chem. Soc., Vol. 75, pp. 379–381 (1953).

Hartung, Ind. Eng. Chem., Vol 37, pp. 126–127 (1945).

NICHOLAS S. RIZZO, *Primary Examiner.*

JOHN D. RANDOLPH, *Examiner.*

DON M. KERR, DONALD D. DAUS,
*Assistant Examiners.*